July 12, 1966                A. N. ORMOND                3,260,937
TRANSDUCER NULL BALANCE POTENTIOMETER CIRCUIT HAVING SINGLE
ENERGIZING SOURCE ALTERNATELY CONNECTED IN PARALLEL
TO THE TRANSDUCER AND BRIDGE
Filed Nov. 9, 1961

INVENTOR.
ALFRED N. ORMOND
BY Elliott & Pastoriza
ATTORNEYS

United States Patent Office 3,260,937
Patented July 12, 1966

3,260,937
TRANSDUCER NULL BALANCE POTENTIOMETER CIRCUIT HAVING SINGLE ENERGIZING SOURCE ALTERNATELY CONNECTED IN PARALLEL TO THE TRANSDUCER AND BRIDGE
Alfred N. Ormond, 11969 Riviera Road,
Santa Fe Springs, Calif.
Filed Nov. 9, 1961, Ser. No. 151,383
4 Claims. (Cl. 324—99)

This invention relates generally to electrical measuring circuits and more particularly to an improved potentiometer circuit for providing accurate indications of the value of output signals from a transducer.

The conventional type of potentiometer circuit over which the present invention constitutes an improvement operates on the principle of balancing the output signal to be measured against a known signal generated in a potentiometer bridge. Thus, the bridge itself includes a variable resistance which is operated by a servo-amplifier and motor system responsive to an error signal constituting a function of the difference between the signal to be measured from the transducer and the known signal generated in the bridge. When the error signal is nulled so that the unknown and known signals are balanced, the setting of the variable resistance in the potentiometer bridge circuit constitutes an indication of the value of the unknown signal. This type of potentiometer circuit is referred to as a millivolt circuit since the output of the transducer may be read in terms of millivolts on the potentiometer.

In potentiometer circuits of the foregoing design, independent power supplies are provided for the transducer and the potentiometer circuit itself. While these power supplies may be designed to have a fixed ratio output of voltage so that proper calibration is possible to provide a desired output reading for a given input signal during subsequent use, any subsequent variation in the ratio of the voltages supplied to the transducer and the potentiometer bridge circuit will result in an error. Thus, even though the voltages for energizing the transducer and potentiometer circuit may be identical or of a known fixed ratio at the time the circuit is calibrated, subsequent changes in the voltages themselves or in their ratio cannot be taken into account.

Another problem with these potentiometers results from the use of a converter means to chop the error signal in such a manner as to provide an A.-C. component to operate the servo-amplifier and motor system in order that the nulling of the signal may be carried out. Such a converter has heretofore been connected in series with one of the output signal leads from the transducer, the converter itself simply switching the input signal to the servo-amplifier between opposite terminals on the primary of the input transformer to the amplifier. As a consequence of this series type of connection, thermal E.M.F.'s, stray pickup, and other noises present on the signal conductors and in the converter switch are amplified in the servo system along with the error signal to be nulled. As a consequence, accurate nulling cannot be achieved with the consequent result of errors in the output reading.

With all of the foregoing in mind, it is a primary object of this invention to provide an improved potentiometer circuit in which the foregoing problems are overcome.

More particularly, it is an object to provide a potentiometer circuit of the millivolt reading type so designed that the transducer and potentiometer circuit will be energized by identical voltages to the end that variations in the particular voltages or the ratios thereof supplied to the transducer and potentiometer circuit, respectively, are avoided, thereby increasing the accuracy of the measuring instrument.

Another important object is to provide an improved potentiometer circuit designed in such a manner that spurious signals resulting from thermal E.M.F.'s, switch noises, and the like will be cancelled to the end that greater accuracy is achieved.

Briefly, these and many other objects and advantages of this invention are achieved by providing a single power supply source for energizing the transducer and potentiometer circuit. By employing a single source, identical voltages are provided so that there is no possibility of any variation in the ratio of the individual voltages energizing the transducer and potentiometer circuits respectively. In addition, the circuit includes dual switch means for effecting the function of the converter heretofore employed in such circuits. The dual switch means are arranged to connect alternately to first and second pairs of conductors in the power circuit leads connecting to the transducer and potentiometer circuit, respectively, in such a manner as to alternately energize the circuits and thereby effect a chopping of the error or difference signal to be nulled and thus provide an A.-C. component for operating the servo-amplifier and motor system. The dual switches are in a parallel arrangement in the power circuit so that any spurious voltage signals as a consequence of the switching itself is excluded from the signal leads.

A better understanding of the invention will be had by now referring to preferred embodiments thereof as illustrated in the accompanying drawings, in which.

Figure 1:
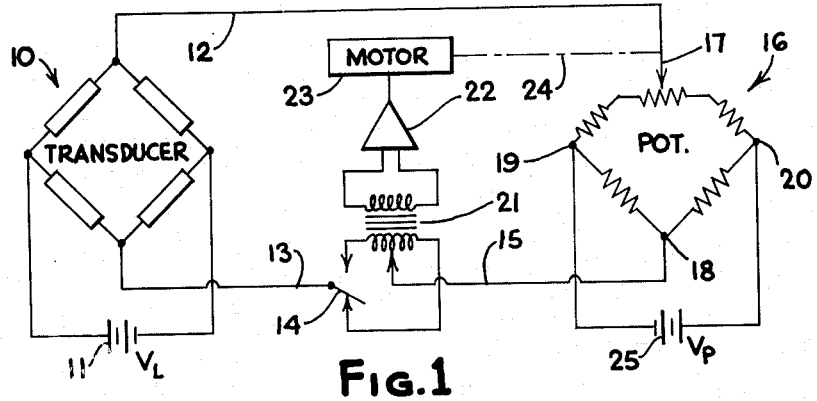
FIGURE 1 is a schematic diagram of a conventional type of millivolt reading potentiometer circuit.

Referring first to FIGURE 1, there is illustrated a transducer 10 which may take the form of a load cell. As shown, the transducer is energized by a first power supply 11 and the output signal or unknown signal to be measured is provided on output leads 12 and 13.

The output leads 12 and 13 constitute signal leads carrying the unknown signal to be measured to the potentiometer circuit. As shown, there is connected in series with the output lead 13 a converting circuit including a chopping switch 14 for alternately connecting the output signal between opposite terminals of the primary of an input transformer center tapped through lead 15. The lead 15 connects to a potentiometer bridge 16. The other output conductor 12 passes directly to a tap 17 on a variable resistance in the potentiometer bridge 16. The diagonally opposite junction 18 of the bridge 16 connects to the lead 15 as shown. The other two diagonally opposite terminals of the bridge are shown at 19 and 20.

The variable tap 17 for the variable resistance in the potentiometer bridge 16 is arranged to be moved by a servo-amplifier and motor system including an input transformer 21 for receiving an error signal which is a function of the difference of the unknown or output signal from the load cell 10 and the signal from the junction point 18 of the potentiometer bridge 16. The transformer 21 feeds into a servo-amplifier 22 to operate a motor 23 mechanically connected as indicated by the dash-dot line 24 to move the tap 17. The arrangement is such that the tap 17 will move in a direction to decrease the error signal until the same is nulled.

The junction points 19 and 20 connect to a separate source of voltage indicated by the battery 25 to energize the bridge.

In the conventional circuit shown in FIGURE 1, any variation in the voltages supplied to the transducer and potentiometer bridge from the separate sources 11 and 25 will result in an erroneous error signal which, upon nulling, will provide an erroneous reading. While the actual power supplies may provide different voltages, and proper readings may be obtained by calibrating the same assuming a fixed ratio to exist between these voltages, errors may still be introduced if the fixed ratio should vary upon subsequent use of the instrument after calibration.

In addition, the converter chopping switch 14 is connected in series with the signal lead 13 and the signal lead 15. As a consequence, undesired spurious signals are introduced to the amplifier motor system. These spurious signals may result from thermal E.M.F.'s, noise in the switch 14, stray pickup, and the like.

Figure 2:
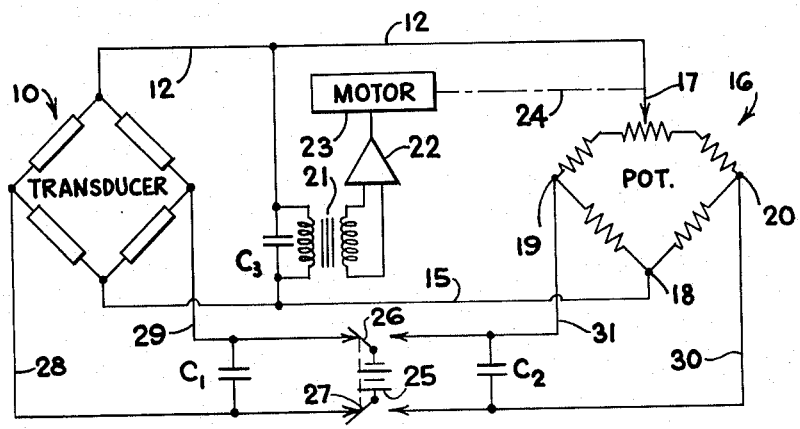
FIGURE 2 illustrates a first embodiment of the improved potentiometer circuit of this invention employing a low impedance servo-amplifier; and, FIGURE 3 illustrates a second embodiment of the improved potentiometer circuit of this invention employing a high impedance servo-amplifier.

Referring now to FIGURE 2, there is shown a first embodiment of the improved potentiometer of this invention in which the foregoing problems are overcome. In accordance with the embodiment illustrated in FIGURE 2, the power supply in the form of the battery 25 is arranged to be connected in parallel to the transducer and the potentiometer bridge. In addition, the converting circuit has been removed from the signal lead 15 in FIGURE 1 and placed in the power supply leads. This circuit includes dual switching means in the form of switch arms 26 and 27 arranged to alternately connect the battery 25 to the supply leads 28, 29 for the transducer and to power supply leads 30 and 31 for the potentiometer bridge. By this arrangement, the power supply 25 is alternately connected to the transducer and potentiometer circuit and therefore, the transducer and potentiometer are energized with identical voltages.

In the embodiment of FIGURE 2, the servo-amplifier 22 has a low impedance and is accordingly connected in parallel with the signal leads 12 and 15 through the primary of the transformer 24. The condenser $C_3$ across this primary filters the signal applied thereto. The particular error signal composed of the difference between the signals alternately supplied to the transformer 21 from the transducer and potentiometer, respectively, as a consequence of the switching of arms 26 and 27 is passed through the transformer to the servo-amplifier 22 and motor 23 to vary the tap 17 and null the error signal to provide the desired output reading in the same manner as in FIGURE 1.

In FIGURE 2, however, it will be evident that the use of the single power supply 25 avoids the difficulties of any variations in the respective voltages applied to the transducer and potentiometer. Moreover, because of the parallel switching arrangement including the switch arms 26 and 27, any thermal E.M.F.'s, switching noises, and the like are the same for both positions of the switches and will therefore be cancelled so that the A.-C. component operating the servo-amplifier and motor is only determined by the actual difference between the unknown signal from the transducer and the known signal provided by the potentiometer bridge 16.

Another advantage of having the converter switching arms in the power supply circuit rather than the signal conductors, is the avoidance of the presence of noise as a consequence of contact resistance switching in the signal conductors themselves. Because of the switching of the power supply alternately between the two circuits, the desired chopping action of the error signal is achieved to provide the desired A.-C. component to operate the servo-amplifier and motor system.

Figure 3:
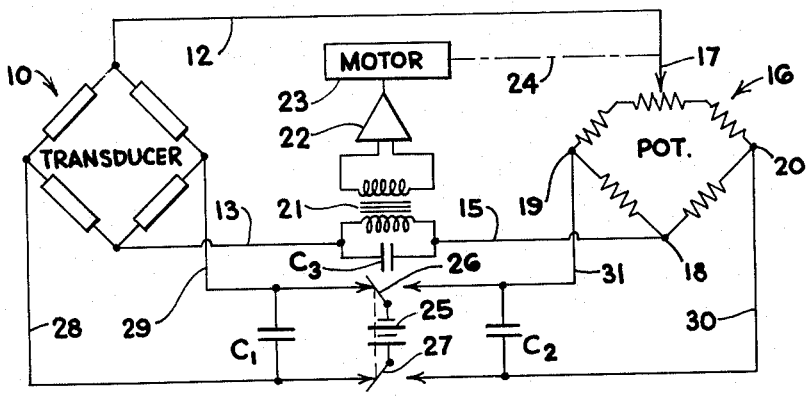

The embodiment of FIGURE 3 is a similar to FIGURE 2 except that the circuit is designed for a high impedance servo-amplifier. Thus, the amplifier 22 is connected in series with the signal leads 13 and 15 as in FIGURE 1, but the converter circuit is still retained in the power supply leads as shown. The various components in FIGURE 3 corresponding to those in FIGURE 2 are identified by the same numerals and the operation of the circuit is the same together with all of the advantages thereof.

In both of the embodiments of FIGURES 2 and 3, the switches may constitute solid state switches such as transistors rather than mechanical switch arms. In this latter event, it might be desirable to provide small condensers $C_1$ and $C_2$ connected across the pairs of power leads to eliminate spikes generated during switching by the transistors.

From the foregoing description, it will be evident that the present invention has provided a greatly improved potentiometer circuit. Not only are errors eliminated as a consequence of variations in separate power supplies, but in addition, thermal E.M.F.'s common to both systems along with noises generated in the switches are cancelled and eliminated from the signal conductors.

While only two particular embodiments of the improved potentiometer circuit of this invention have been set forth and described in detail, various changes that fall clearly within the scope and spirit of the invention will occur to those skilled in the art. The potentiometer circuit is therefore not to be thought of as limited to the exact embodiments set forth.

What is claimed is:

1. An improved potentiometer circuit for indicating the value of an ouput signal from a transducer by nulling the same in a potentiometer bridge, including: a variable resistance in said potentiometer bridge; a servo-amplifier and motor system connected to operate said variable resistance in response to an error signal constituting a function of the difference between said output signal and a known signal generated in said bridge to effect nulling of said error signal; a single D.-C. source; and dual switch means positioned in two pairs of conductors, respectively, for alternately connecting said transducer and potentiometer bridge in parallel across said D.-C. source so that said transducer and bridge are energized by an identical potential whereby spurious signals as a consequence of variations in the power respectively supplied to said transducer and bridge are eliminated, said switches operating at a given frequency to effect a chopping of said error signal and provide an A.-C. component for operating said servo-amplifier and motor system.

2. In a potentiometer circuit in which an unknown signal from a transducer is balanced against a known signal in a potentiometer bridge having a variable resistance tap adjusted by a servo-amplifier and motor system responsive to an error signal constituting a function of the difference between said unknown signal and said known signal to move said tap in a direction to null said error signal, the improvement comprising: a single D.-C. source adapted to energize said transducer and potentiometer bridge so that said transducer and potentiometer bridge are energized by an identical voltage; and dual switch means for alternately connecting said D.-C. source in parallel to two pairs of given conductors respectively connected to said transducer and potentiometer bridge at a given frequency to effect a chopping of said error signal and provide an A.-C. component for operating said servo-amplifier and motor system.

3. An improved potentiometer circuit according to claim 2, in which said transducer and potentiometer bridge are connected to said servo-amplifier in parallel.

4. An improved potentiometer circuit according to claim 3, including first and second condensers connected across the two power supply conductors in each of said pairs, respectively.

(References on following page)

References Cited by the Examiner

UNITED STATES PATENTS

| | | | |
|---|---|---|---|
| 2,417,015 | 3/1947 | Razek | 340—187 |
| 2,453,607 | 11/1948 | Wardle | 177—211 |
| 2,750,547 | 6/1956 | Wannamaker. | |
| 2,766,981 | 10/1956 | Lauler | 324—99 |
| 2,767,974 | 10/1956 | Ballard | 177—211 |
| 2,846,645 | 8/1958 | Ruge. | |
| 2,889,517 | 6/1959 | Ehret | 324—99 |
| 2,949,769 | 8/1960 | Heller | 324—99 |

WALTER L. CARLSON, *Primary Examiner.*

R. V. ROLINEC, J. MULROONEY, *Assistant Examiners.*